United States Patent Office 3,179,676
Patented Apr. 20, 1965

3,179,676
ORGANOTIN-ORGANOPHOSPHORUS COMPOUNDS AND A METHOD FOR PREPARING THE SAME
Charles J. Stern, Jr., Westfield, N.J., assignor to Nease Chemical Company, Inc., State College, Pa., a corporation of Pennsylvania
No Drawing. Filed Mar. 28, 1961, Ser. No. 98,789
10 Claims. (Cl. 260—429.7)

This invention relates to novel biocidal compounds and to methods for the preparation thereof. More particularly, the present invention relates to novel highly effective fungicidal and bactericidal organotin-organophosphorus compounds which are advantageously combined with paints and plastic formulations and which are, in addition, useful in the treatment of paper, cloth, leather, wood, and other fibrous and insulating materials, to render these materials resistant to deterioration caused by bacteria and fungi; and to methods for the preparation thereof.

Fungicidal and bactericidal compositions employed heretofore have been known to present one or a plurality of difficulties. Thus, for example, fungicidal and fungistatic chlorinated phenols are normally highly toxic, necessitating special handling. In addition, they cause discoloration of plastics and paint films; are corrosive to metals; and are usually ineffective at low treatment levels. Similarly, fungicidal mercapto-dicarboximide compounds when used in clear formulations of coatings and plastics, reduce the heat and light stability thereof and are, in addition, malodorous. In like manner, many copper-containing fungicides result in high treatment costs; discoloration of the paints and plastics in which they are incorporated; are effective over an abbreviated period of time; and involve difficulty in formulation because of poor solubility characteristics. Phenyl mercurials are also employed as biocidal agents and yet are uneconomic, highly toxic, corrosive to metals, and prohibited in certain military specifications for plastic materials.

Accordingly, it is an object of the present invention to provide novel thermally stable biocidal organotin-organophosphorus compounds which are particularly effective in the inhibition and destruction of fungi and bacteria; and which are readily incorporated in a wide range of resins, paints and plasticizers, as well as cloth, leather, wood and the like and which are stable against oxidation by air and are resistant to hydrolysis under all conditions of manufacture, storage, and use. The organotin-organophosphorus compounds provided by the practice and within the purview of the present invention are characterized, in addition, by low vapor pressure, non-corrosivity to metals and solubility in polar and non-polar solvents depending upon the nature of the organic substituents.

The novel biocidal compounds of the invention are represented by the general formulae:

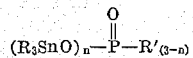

and

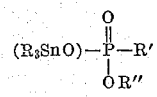

wherein R is a substituted or unsubstituted alkyl radical; R' is a heterocyclic radical or a substituted or unsubstituted hydrocarbyl radical; R'' is a heterocyclic radical, a substituted or unsubstituted hydrocarbyl radical, a hydrogen atom or the radical of any compound capable of reacting with an acidic hydrogen; and n is an integer from 1 to 2 inclusive. The term "hydrocarbyl radical" as employed herein is intended to encompass monovalent hydrocarbon radicals including alkyl, aryl, aralkyl, alkaryl, and cycloaliphatic hydrocarbon radicals. The hydrocarbyl substituent represented by each of the symbols R' and R'' in the above recited formulae will normally contain from 1 to 20 carbon atoms. This is, of course, particularly true where R' is an alkyl radical, for example. Where R' is an aryl, aralkyl or alkaryl radical, the number of carbon atoms may be in the range of 6 to 20 carbon atoms; and where R' is a cycloaliphatic radical, 3 to 20 carbon atoms circumscribes the proper range. Where R' is a heterocyclic radical, the number of carbon atoms may be in the range of 12 to 20 carbon atoms, as well. Each of the radicals represented by R contains from 1 to 12 carbon atoms with the sum of the carbon atoms of the R substituents attached to each stannic moiety being within the range of 8 to 14.

The preferred biocidal compounds of the invention are embraced by the formula:

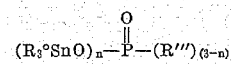

wherein R° is butyl and R''' is a member selected from the group consisting of alkyl and hydroxyalkyl radicals containing from 1 to 7 carbon atoms, a phenyl radical and a trihaloalkyl radical, and preferably a trichloroalkyl moiety, such as trichloromethyl.

Illustrative of the biocidal compounds embraced by the above general formulae are tributyltin-di(hydroxymethyl)phosphinate, di(tributyltin)hydroxymethyl phosphonate, di(tributyltin)trichloromethyl phosphonate, tributyltin-di(hydroxyheptyl)phosphinate, tributyltin-dihexyl phosphinate, diethylmonobutyltin - di(hydroxymethyl) phosphinate, di-(dimethylmonoheptyltin)hydroxymethyl phosphonate, di - (diethylmonononyltin)trichloromethyl phosphonate, dimethylmonododecyltin - di(hydroxyheptyl)phosphinate, tripropyltin-dihexyl phosphinate, tributyltin-diphenyl phosphinate, and di(tributyltin)phenyl phosphonate.

The term "biocidal" as employed throughout this specification is intended to designate, as indicated hereinabove, an agent characterized by a fungicidal, fungistatic, bactericidal, and/or bacteriostatic activity.

In their pure state, the compounds of the invention are normally colorless or slightly colored, viscous liquids or white crystalline or amorphous solids. To facilitate handling of these compounds for use as biocidal agents, they may be furnished as solutions in the usual organic solvents and plasticizers. Stable water dispersions of these compounds may also be utilized.

The aforesaid compounds are prepared by reaction of a trialkyltin oxide with an organic phosphinic acid or an organic phosphonic acid, which is included in the formulae:

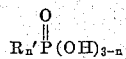

and

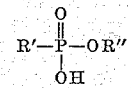

wherein each of R', R'', and n has the value attributed to it hereinabove.

Illustrative of the alkyl stannic oxide components employed as reactants herein are bis-tributyltin oxide, bis-diethylmonobutyltin oxide, bis-dimethylmonoheptyltin oxide, bis-diethylmonononyltin oxide, bis-dimethylmonododecyltin oxide, and bis-tripropyltin oxide.

Representative phosphinic and phosphonic acid reactants are di(hydroxymethyl)phosphinic acid, hydroxymethyl phosphonic acid, trichloromethyl phosphonic acid, di(hydroxyheptyl)phospinic acid, dihexyl phosphinic acid, phenyl phosphinic acid, and phenyl phosphonic acid.

The proportions of organotin and organophosphorus reactants are normally determined by the number of hydroxy substituents attached to the phosphorus nucleus of the organophosphorus reactant. Thus the molar proportions of reactants where the alkyl stannic oxide is being reacted with a phosphonic acid is at least 1:2 and may be in the ratio of 1:1 respectively; whereas when the organophosphorus compound is a phosphinic acid the ratio of trialkyltin oxide to phosphinic acid is normally 1:2 respectively. While ambient temperatures, i.e. 25° C., may be employed to effect the reaction herein described, the reaction proceeds more efficaciously at elevated temperatures of 100° C. and higher but at a point below the decomposition point of the reactants and reaction product. A reaction temperature within the range of 125° C. to 160° C. is preferred.

The compounds of the invention formed in the manner described hereinabove are capable of inhibiting the growth of a wide spectrum of microorganisms at comparatively low concentrations. The activity of these compounds in controlling fungal and bacterial growth has been determined by the following test procedure. Malt agar solutions containing known concentrations (0.1, 0.2, 0.5, 1, 2, and 5 parts per million based on tin content only of each of the compounds, tributyltin-di(hydroxymethyl) phosphinate, bis-tributyltin-hydroxymethyl phosphonate, bis-tributyltin-trichloromethyl phosphonate, tributyltin-di(hydroxyheptyl)phosphinate, and tributyltin-dihexyl phosphinate were inoculated with the fungus spores and bacteria recited in Table I. The inoculated solutions were incubated for two days at 25° C. and a visual and microscopic examination was then made. The concentrations of each of the aforesaid compounds recited in Table I represent the minimum concentrations causing complete inhibition of growth in each instance.

TABLE I

| Microorganism | Concentration (p.p.m. tin) Causing Complete Inhibition of Growth of Microorganism |
| --- | --- |
| Bacillus mycoides | 0.1 |
| Bacillus subtilis | 0.5 |
| Micrococcus aureus | 0.5 |
| Bacterium ammoniogenes | 0.5 |
| Microsporum audouini | 0.2 |
| Aspergillus niger | 0.2 |
| Aspergillus terreus | 0.2 |
| Aspergillus flavus | 0.2 |
| Penicillium digitatum | 0.2 |
| Pencillium expansum | 0.5 |
| Penicillium funiculosum | 2.0 |
| Penicillium piscarium | 0.5 |
| Pullularia pullulans | 0.2 |
| Trichoderma viride | 0.5 |

In a typical application of the invention, a polyvinyl chloride film formulation was prepared incorporating fungistatic organotin-organophosphorus compounds of the present invention as well as known fungistatic compositions employed hitherto; each being employed in a concentration of one part per hundred of film formulation.

The concentrations of the organotin-organophosphorus compounds were measured on the basis of the tin content. The resin film formulation was constituted as follows:

| | Parts |
| --- | --- |
| Polyvinyl chloride resin (Geon 101) | 100 |
| Di(2-ethylhexyl)phthalate plasticizer | 40 |
| Acrawax C | 2 |
| Barium-cadmium stabilizer (Mark WS) | 2 |

The term "parts" as employed heren refers to parts by weight unless otherwise explicitly indicated. The compounds of the invention together with those known hitherto employed in this test procedure are listed in Table II.

TABLE II

| Test No. | Fungistatic Compounds |
| --- | --- |
| 1 | Tributyltin-di(hydroxymethyl)phosphinate. |
| 2 | Bis-Tributyltin-hydroxymethyl phosphonate. |
| 3 | Bis-Tributyltin-trichloromethyl phosphonate. |
| 4 | Tributyltin-di(hydroxyheptyl)phosphinate. |
| 5 | Tributyltin-di(hexyl)phosphinate. |
| 6 | 2,2'-Dihydroxy-5,5-dichlorodiphenyl methane. |
| 7 | 2,2'-Methylene-3,4,6-trichlorophenol. |
| 8 | N-Trichloromethyl mercapto-4-cyclohexene-1,2-dicarboximide. |
| 9 | Dodecyl dimethyl benzyl ammonium cyclopentane carboxylate salt. |
| 10 | Phenyl mercuric composition (Corobex CpV, a trade name). |
| 11 | 2,4-Dichloro-6-(o-chloroanilino)-s-triazene. |
| 12 | Trichlorophenyl acetate. |
| 13 | P-Chloro-meta-xylenol derivative (Ottacide P, a trade name). |
| 14 | Control sample (containing no fungistat). |

The ingredients were thoroughly dry blended and placed on a laboratory roll mill and milled for three minutes at 320° F. The mill gauge was set at 0.040 inch and the material removed from the mill and cooled. Discs, 15 mm. in diameter of polyvinyl chloride film composition, each containing a fungistat of Table II in the concentration recited therein, and a control disc of the aforesaid film and dimensions were placed in an agar medium, seeded with a suspension of spores and fragments of three fungi, Aspergillus niger, Aspergillus flavus and Trichoderma sp. and incubated at 25° C. for a period of fifteen days. The plastic film composition and the adjacent culture medium were examined in each instance approximately every three days for growth and changes in appearance. No growth of the aforesaid fungi was observed on any of the film samples in Test Nos. 1 to 5 of Table II wherein fungistatic organotin agents of the present invention were employed. Significant growth of the aforesaid fungal cultures occurred however where the remaining fungistatic compounds recited in Table II and utilized in Tests Nos. 6 to 13 thereof were employed.

In addition to the ability to control a wide spectrum of fungi, bacteria and similar microorganisms at low concentrations, the compounds of the invention have the advantages of not imparting color to or altering the color of compositions in which they are incorporated; but serve to improve the heat and light stability thereof. These compounds have characteristically, in addition, a low volatility allowing permanence in treatment as a result and excellent weatherability. Further, these compounds combine protection against many types of microorganisms in a single material while resisting extraction from films by water or organic solvents. At the same time, the compounds of the invention are noncorrosive to metals and are compatible with a very wide range of resins and plasticizers and thus can be furnished in convenient form to permit ease in handling. The effective treatment cost employing these compounds is also very low.

In addition to plastic resin formulations such as those described above, the biocidal compounds of the invention can be employed in other continuous materials and films to inhibit growth of microorganisms; thus they can be utilized in water-based paint formulations; oil-based paint and other coating formulations, for example, varnishes, lacquers, shellacs, enamels, marine anti-fouling paints and coatings, and the like; woven and coated fabrics; as well as leather, paper, and wood. The compounds of the invention can also be employed in agricultural sprays and dusts for effective pest control. Similarly, they may be included in conventional ointment formulations for control of microorganisms on hides and skin or in a variety of organic and aqueous solutions. The amount of active biocidal compound included in any continuous material or in an ointment, spray, or dust as described above is normally within the range, and preferably in excess, of one part per million (p.p.m.) to 2 parts per hundred (p.p.h.). Larger concentrations may however be employed if deemed desirable; the recited concentrations being based on tin content by weight thereof.

The following examples further illustrate the preparation of the organotin compounds of the invention:

EXAMPLE 1

*Preparation of the chemical compound, tributyltin-di(hydroxymethyl)phosphinate*

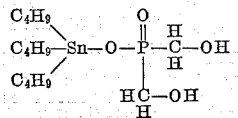

To 29.8 grams of bis-tributyltin oxide (0.05 mol) was added 12.6 grams (0.1 mol) of dihydroxymethyl phosphinic acid in a three neck, round bottom flask which is heated by an electric heating mantle and is equipped with an agitator, a condenser and Dean-Stark trap. The mixture was heated under agitation to 160° C. and approximately 1 ml. (0.9 gram) of water was collected in the Dean-Stark trap. 41.5 grams of a clear, slightly-colored viscous liquid product, tributyltin-di(hydroxymethyl)phosphinate, which solidified on long standing, was obtained. The melting point of the solid product was 60.5° C.

EXAMPLE 2

*Preparation of the chemical compound, di(tributyltin) hydroxymethyl phosphonate*

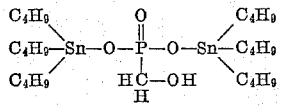

Following the procedure of Example 1, to 29.8 grams of bis-tributyltin oxide was added 5.6 grams (0.05 mol) of hydroxymethyl phosphonic acid. Upon heating, 0.9 gram of water was removed and 34.5 grams of product, di-tributyltin-hydroxymethyl phosphonate, a faintly colored, very viscous liquid having an index of refraction of 1.5122 at 20° C., and which slowly crystallizes on standing, was obtained.

EXAMPLE 3

*Preparation of the chemical compound, tributyltin-di(hydroxyheptyl)phosphinate*

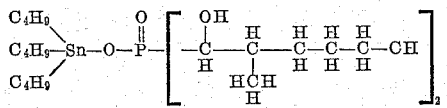

Following the procedure of Example 1, to 6.0 grams of bis-tributyltin oxide was added 5.9 grams (0.01 mol) of di(hydroxyheptyl)phosphinic acid. Upon heating to 150° C. under 30 mm. Hg vacuum, 0.2 gram of water was removed leaving 11.7 grams of product, tributyltin-di(hydroxyheptyl)phosphinate, a viscous, slightly colored liquid having an index of refraction of 1.4938 at 22° C.

EXAMPLE 4

*Preparation of the chemical compound, di(tributyltin) trichloromethyl phosphonate*

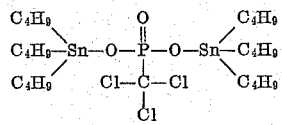

To 29.8 grams of bis-tributyltin oxide was added 10.0 grams of trichloromethyl phosphonate in accordance with Example 1. After removal of 0.9 gram of water under heat and vacuum, 38.9 grams of product, di(tributyltin) trichloromethyl phosphonate, a clear, viscous liquid, having an index of refraction of 1.5175 at 30° C., was collected.

EXAMPLE 5

*Preparation of the chemical compound, tributyltin-dihexyl phosphinate*

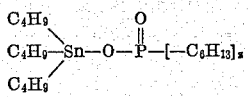

Following the procedure of Example 1, to 2.6 grams of bis-tributyltin oxide was added 2.0 grams of dihexyl phosphinic acid. After removal of 0.1 gram of water under heat and vacuum, 4.5 grams of tributyltin-dihexyl phosphinate, a cloudy liquid having an index of refraction of 1.4901 at 20° C. was collected.

EXAMPLE 6

*Preparation of the chemical compound, tributyltin-diphenyl phosphinate*

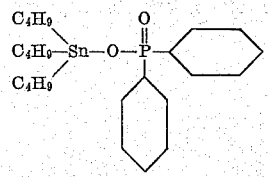

The procedure of Example 1 was followed using 71 grams of phenyl phosphinic acid and 149 grams bis-tributyltin oxide. 216 grams of a clear viscous liquid, tributyltin-diphenyl phosphinate, having an index of refraction of 1.5292 at 20° C., was obtained.

EXAMPLE 7

*Preparation of the chemical compound, phenyl di(tributyltin)phosphonate*

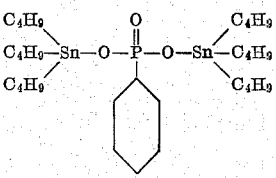

To 39.5 grams of phenyl phosphinic acid was added 149 grams of bis-tributyltin oxide and following the procedure of Example 1, 182 grams of a viscous, slightly cloudy liquid, phenyl di(tributyltin)phosphonate, having an index of refraction of 1.5220 at 20° C., was obtained.

What is claimed:
1. The chemical compound tributyltin-di(hydroxymethyl)phosphinate.
2. The chemical compound bis-tributyltin-hydroxymethyl phosphonate.
3. The chemical compound bis-tributyltin-trichloromethyl phosphonate.
4. The chemical compound tributyltin-di(hydroxyheptyl)phosphinate.
5. A process for the preparation of tributyltin-di(hydroxymethyl)phosphinate which comprises reacting bis-tributyltin oxide and di(hydroxymethyl)phosphinic acid at a temperature within the range of 125° C. to 160° C.
6. A process for the preparation of bis-tributyltin-hydroxymethyl phosphonate which comprises reacting bis-tributyltin oxide with hydroxymethyl phosphonic acid at a temperature within the range of 125° C. to 160° C.
7. A process for the preparation of bis-tributyltin-trichloromethyl phosphonate which comprises reacting bis-tributyltin oxide with trichloromethyl phosphonic acid at a temperature within the range of 125° C. to 160° C.
8. A process for the preparation of tributyltin-di(hydroxyheptyl)phosphinate which comprises reacting bis-tributyltin oxide with di(hydroxyheptyl)phosphinic acid at a temperature within the range of 125° C. to 160° C.
9. A process for the preparation of tributyltin-dihexyl phosphinate which comprises reacting bis-tributyltin oxide with dihexyl phosphinic acid at a temperature within the range of 125° C. to 160° C.

10. Process for the preparation of an organotin-organophosphorus compound selected from the group consisting of tributyltin-di(hydroxymethyl)phosphinate; di(tributyltin)hydroxymethyl phosphonate; di(tributyltin)trichloromethyl phosphonate; tributyltin-di(hydroxyheptyl)phosphinate; tributyltin-dihexyl phosphinate; diethylmonobutyltin - di(hydroxymethyl)phosphinate; di(di - methylmonoheptyltin)hydroxymethyl phosphonate; di(diethylmonononyltin)trichloromethyl phosphonate; dimethylmonododecyltin - di(hydroxyheptyl)phosphinate; tripropyltin - dihexyl phosphinate; tributyltin - diphenyl phosphinate; and di(tributyltin)phenyl phosphonate that comprises, reacting at a temperature within the range of from 125–160° C. an alkyl stannic oxide member selected from the group consisting of bis-tributyltin oxide, bis-diethylmonobutyltin oxide, bis-dimethylmonoheptyltin oxide, bis-diethylmonononyltin oxide, bis-dimethylmonododecyltin oxide, and bis-tripropyltin oxide, with an organophosphorus acid member selected from the group consisting of di(hydroxymethyl)phosphinic acid, hydroxymethyl phosphonic acid, trichloromethyl phosphonic acid, di(hydroxyheptyl)phosphinic acid, dihexyl phosphinic acid, phenyl phosphinic acid and phenyl phosphonic acid.

References Cited by the Examiner

UNITED STATES PATENTS

| | | | |
|---|---|---|---|
| 2,789,106 | 4/57 | Tomka et al. | 260—45.75 |
| 2,805,234 | 9/57 | Gloskey | 260—429.7 |
| 2,872,468 | 2/59 | Leistner et al. | 260—429.7 |
| 2,910,452 | 10/59 | Crauland | 260—45.75 |
| 2,992,738 | 1/60 | McDermott et al. | 260—429.7 |
| 3,055,925 | 9/62 | Hartle | 260—437 |

TOBIAS E. LEVOW, *Primary Examiner.*